3,047,496
WIRE DRAWING COMPOSITIONS AND PROCESSES OF MAKING THE SAME

Russell H. Rogers, Palos Park, and John D. Opem, Chicago, Ill., assignors to Swift & Company, Chicago, Ill., a corporation of Illinois
No Drawing. Filed July 27, 1959, Ser. No. 829,545
13 Claims. (Cl. 252—18)

The present invention relates in general to the manufacture of metallic soaps. More specifically the invention is directed to an essentially dry process for the manufacture of alkaline-earth metal soaps prepared by direct fusion of the hydroxide of the metal with fats and to the product formed thereby.

Conventionally the fusion process involves the reaction of fatty acids and the metal oxide or hydroxide to form the metal soap. The process is often carried out under steam pressure at temperatures of about 325°–400° F. or more, under which conditions the reaction takes about 3½–5 hours. An improved process of reacting fatty acids with the metal oxide or hydroxide is disclosed and claimed in U.S. Patent No. 2,890,232 issued June 9, 1959 to Rogers et al. The reactants in these processes are substantially dry. It has not been found possible to practice the above methods with fatty glycerides and alkaline-earth metal hydroxides without use of either excessive temperatures (e.g. 400°–500° F.) or very lengthy reaction times (about 4 hours).

A wet fusion process, or slurry process, is essentially the same, chemically as the above, but large quantities of water are present in the reaction mixture. After the reaction is complete the water must be evaporated from the soap. The large amount of water makes the process difficult to handle. A similar wet process is known where the starting reactants are fat, metal oxides and water. A relatively concentrated glycerine solution containing metal soap is formed. The reaction takes up to about 10 hours.

It is the principal object of the present invention to provide an essentially dry process for preparing alkaline-earth metal soaps from fats and metal hydroxides at relatively low temperatures and in relatively short periods of time.

Another object of the invention is to prepare a metal soap from fats and metal hydroxides in about an hour or less and at relatively low temperatures and where the resultant product has a low moisture content and a low percentage of unreacted fat.

An additional object of the invention is to prepare a compound suitable for use in wire drawing which is prepared by direct fusion of fats and calcium hydroxide and which can be so proportioned that the compound will be firm and stable and can contain up to about 70% free lime uniformly dispersed with about 30% calcium soap.

Further objects and advantages will become apparent to those skilled in the art from a reading of the following description of our invention.

We have discovered a process wherein a saponification reaction is initiated between fats and alkaline-earth metal hydroxides at relatively low temperatures, i.e., in the neighborhood of about 20°–50° F. above the melting point of the solid fats and at about the boiling point of water for the normally liquid fats, and completed at less than about 325° F. The reaction will be complete in a relatively short period of time, usually in minutes, and in not more than about an hour. In its preferred form, the reaction takes place at atmospheric pressure. The product obtained has a low moisture content and a low unreacted fat content.

In general our process involves the reaction of fat with metal hydroxides in the presence of a small amount of a monohydric alcohol having a boiling point above about 200° F., or a polyhydric alcohol. The amount of mono- or polyhydric alcohol added to the reaction mixture is that amount which will catalytically influence the saponification reaction. It will generally be within about .5–10%, by weight of the reaction mixture, with perhaps 1–2½% being the preferred amount. The reaction generally will commence above about 200° F. and will usually be complete in about 5–30 minutes, having achieved temperatures in the vicinity of about 250°–325° F.

The fats which are suitable for use in our process are the glycerides of higher aliphatic monocarboxylic acids. These glycerides generally have chain lengths of from 10–22 carbon atoms. They may be saturated or unsaturated and may consist of mixtures of various glycerides. Any fats and oils containing high molecular weight acids such as stearic, oleic, linoleic, linolenic, palmitic, lauric, etc., are suitable. Representative animal, vegetable and marine fats are tallow, grease, whale and fish oil, lard, coconut oil, palm oil, cottonseed oil, soybean oil, peanut oil, palm kernel oil, olive oil, cottonseed oil foots and other foots, corn oil, etc. The fats are also suitable when hydrogenated, partially or completely. Diglycerides as well as triglycerides may be used.

The materials useful as catalysts in our invention are the monohydric aliphatic alcohols having boiling points above about 200° F. and polyhydric alcohols. The polyhydric alcohols are preferred and are those aliphatic alcohols containing more than one hydroxyl group. The diols, triols, tetritols, and sugar alcohols, etc., are suitable. Examples of particularly suitable polyols useful as catalysts in our reaction include monoglycerides, the glycols and polyglycols (for example, diethylene glycol, 1,3 butylene glycol, dipropylene glycol, ethylene glycol, propylene glycol, trimethylene glycol, carbitol, glycol ethers, and the high molecular weight (m.wt. 400–9,000) polyglycols), glycerol, pentaerythritol, mannitol, sorbitol, etc. Representative monohydric alcohols that are suitable for use in our invention are dodecyl alcohol, decyl alcohol, tridecyl alcohol, nonyl alcohol, tetradecyl alcohol, cetyl alcohol, etc. The catalytic amount of monohydric alcohol will usually be about 2–5 times that of the polyhydric alcohol, often between 4% and 10% by weight of the mixture.

The fat is mixed with the metal hydroxide, particularly calcium or other alkaline-earth metal. The metal hydroxide should usually be substantially anhydrous and be present preferably in excess, and can be present in amounts such as between about 159–224% over stoichiometric for certain purposes which will be discussed hereinafter. The hydroxide may be present in amounts of about 1920–2240% over stoichiometric. The reactants are heated in the presence of the catalyst and the saponification reaction commences at a temperature which will vary with the type of reactant involved, and usually between about 200°–250° F. Saponification will usually be essentially complete in about 5–30 minutes where the temperature has been elevated from that at which the reaction was initiated to the vicinity of 250°–325° F.

Since our process is essentially a dry process (i.e. substantially no moisture is present in the reaction other than that which may be formed during the reaction as, for example, by esterification of the very minor amounts of free fatty acid that may be present in the fat) the resultant soaps prepared by our process have a sufficiently low moisture content that no drying step is required. A drying step would be required for soaps containing more than about 8–10% moisture or, in the case of a soap to be used for wire drawing, about 2–3% moisture. Our product also contains very low percentages of unreacted fat. In most cases the amount will be less than about 6% as determined by the Soxhlet extraction method, a commonly used standard analytical procedure. The calcium soap is extremely well adapted to use as a wire drawing soap.

An additional advantage of our process lies in the ability to prepare a stable wire drawing compound of good mechanical strength and containing up to about 70% free lime uniformly dispersed in the calcium soap. This is an unexpected feature of our invention which is apparently attributable to the use of the glycerides rather than the free fatty acids. When using the acids we have found that the maximum amount of free lime that can satisfactorily be manufactured with a calcium soap is about 60%. Attempts to fuse fatty acids with calcium hydroxide in the proportion of 70% free lime to 30% calcium soap have been unsuccessful, producing a fine, powdery, non-uniform product.

Another advantage of our process lies in the reduced cost of preparing the product due to the lower cost of fat as compared to fatty acids. The acids are roughly 3–4 cents per pound more costly than the fats, making it more difficult to sell a product made with the acids at a competitive price.

The following illustrative examples are provided to illustrate our process and are not intended as limiting on the scope of the invention other than as indicated in the appended claims.

Example I

.93 pound of hydrogenated tallow, 58° C. titer was mixed with .05 pound diethylene glycol and heated to 280° F. One pound of hydrated lime was added. The reaction took place immediately and was complete in 15 minutes. The soap analyzed as follows: 1.45% unreacted fat, 2.9% moisture and 46.6% free lime. 4.8% glycerine was split from the triglyceride.

Example II

The same proportions of tallow and lime as in Example I were mixed with .05 pound of 400 molecular weight polyglycol. The saponification reaction went to completion in 15 minutes at 280° F. The product analyzed .63% moisture, 5.5% unreacted fat, 47.4% free lime, and 4.6% glycerine split from the tallow.

Example III 9.3 pounds of tallow was mixed with .25 pound of glycerine and heated to 250° F. At that point 10 pounds of calcium hydroxide were added. A saponification reaction commenced immediately and was complete in 15 minutes. The product had an unreacted fat content of 2.52%, .80% moisture, and 48.10% free lime.

Example IV

A mixture of reactants identical to those in Example I, except that .05 pound pentaerythritol was substituted for the diethylene glycol, was prepared. The saponification reaction was complete at 280° F. and took 15 minutes. The product analyzed as follows: 1.43% moisture, 3.7% unreacted fat, and 45.3% free lime. 3.6% glycerine was split from the fat.

Example V

Fifty pounds tallow, 150 pounds calcium hydroxide, and 4 pounds glycerine were heated to 250° F. After 30 minutes the temperature had been elevated to 290° F. and the reaction had gone to completion. The product was dry and ready for grinding and packaging. The product analyzed as follows: 1.7% moisture, .98% unreacted fat, 67.1% free lime. In this example, 1.3% free glycerine split from the glycerides.

Example VI 1.25 pounds of refined tallow and 0.05 pound glycerine were heated to a temperature of 220° F. 0.75 pound calcium hydroxide was added. The saponification reaction was complete in 25 minutes and analyzed as follows: 1.6% moisture and volatile matter, 5.2% free fat, and 33.3% free lime.

Example VII

A saponification reaction was initiated at 250° F. in a mixture of 0.93 pound hydrogenated tallow triglycerides, and 1.0 pound calcium hydroxide, in the presence of 0.01 pound glycerine. The reaction took 25 minutes to go to completion. The product contained 0.6% moisture, 1.1% free fat, and 46.1% free lime.

Example VIII 0.93 pound coconut oil and 0.05 pound glycerine were heated to 250° F., at which time a saponification reaction was initiated by the addition of one pound of calcium hydroxide. After 5 minutes the mixture became heavy enough to stall the mixer and the reaction was complete. The product analyzed at 1.8% moisture, 4.3% unreacted fat and 46.1% free lime.

Example IX 1.5 pounds hydrogenated tallow triglycerides, .05 pound glycerine and .5 pound calcium hydroxide were mixed and heated to a temperature of 250° F. In 15 minutes the saponification reaction was complete. The product contained about 20% free lime.

Example X 200 grams hydrogenated tallow triglycerides and 20 grams of glycerine were mixed and heated to 250° F. At this point 200 grams $Ba(OH)_2.8H_2O$ was added and the temperature dropped to 200° F. The temperature remained in the vicinity of 210° F. for 15 minutes, with boiling. After that period of time, the water had boiled off and the boiling ceased, the temperature then began to rise. After a total of 25 minutes the soap had thickened enough to stop the mixer and the reaction was considered complete. The mixture had attained a temperature of 250° F.

Example XI

A mixture of 200 grams hydrogenated tallow triglycerides and 20 grams glycerine were heated to 220° F. 240 grams of magnesium hydroxide were added. A saponification reaction commenced and was complete after 30 minutes, having attained a temperature of 300° F.

Example XII

.93 pound tallow and .10 pound monoglycerides were mixed and heated to 250° F. One pound calcium hydroxide was added. The saponification reaction was complete in 15 minutes.

Example XIII

.93 pound tallow triglycerides and .22 pound tridecyl alcohol were mixed and heated to 220° F. .93 lb. calcium hydroxide was added. The saponification reaction was complete in 30 minutes.

Example XIV 200 grams crude corn oil, 10 grams glycerine and 215 grams calcium hydroxide were blended at room temperature and heat was applied. After 15 minutes the mixture had reached 250° F. and began thickening. The saponification reaction was complete in an additional 5 minutes, having attained a temperature of 290° F.

Obviously many modifications and variations of the invention as hereinbefore set forth may be made without departing from the spirit and scope thereof, and therefore only such limitations should be imposed as are indicated in the appended claims.

We claim:
1. An improved wire drawing composition which is essentially dry, firm and of good mechanical strength and which comprises a stable uniform dispersion of about 20–70% calcium hydroxide adsorbed by 80–30% calcium soap of a glyceride ester of higher aliphatic monocarboxylic acids, and from about 0.5–14.8% glycerine.

2. An improved wire drawing composition which is essentially dry, firm, and of good mechanical strength and which comprises a stable, uniform dispersion of calcium hydroxide adsorbed by calcium soaps of glyceride esters of higher aliphatic monocarboxylic acids, above about 60% of said dispersion and up to about 70% thereof being calcium hydroxide, said composition containing from about 0.5 to 14.8 glycerine.

3. A method of manufacturing alkaline-earth metal soaps which comprises: mixing fat with an amount of alkaline-earth metal hydroxide, said amount being between about 159% and 2240% over stoichiometric, and a small amount sufficient to catalytically influence a saponification reaction of a material selected from the group consisting of monohydric alcohols having a boiling point above about 200° F. and polyhydric alcohols, applying sufficient heat to the mixture to initiate a saponification reaction, and allowing said reaction to go to completion.

4. A method of manufacturing alkaline-earth metal soaps which comprises: forming a mixture of between about 159–2240% over stoichiometric of alkaline-earth metal hydroxide, glycerides of higher aliphatic monocarboxylic acids and an amount sufficient to catalytically influence a saponification reaction of a material selected from the group consisting of monohydric alcohols having a boiling point above about 200° F. and polyhydric alcohols, heating the mixture to initiate a saponification reaction, and allowing said reaction to go to completion at temperatures below about 325° F.

5. A method of preparing essentially dry alkaline-earth metal soaps which comprises: heating a mixture of fatty glycerides and between about 159–2240% over stoichiometric of alkaline-earth metal hydroxide in the presence of about 0.5–10% of a material selected from the group consisting of monohydric alcohols having a boiling point above about 200° F. and polyhydric alcohols to initiate a saponification reaction, and allowing said reaction to go to completion.

6. In the method of manufacturing alkaline-earth metal soaps by direct fusion of fat and the metal hydroxide, the improvement comprising: adding to a mixture of glycerides of higher aliphatic monocarboxylic acids and between about 159–2240% over stoichiometric of alkaline-earth metal hydroxide, an amount sufficient to catalytically influence a saponification reaction of a material selected from the group consisting of monohydric alcohols having a boiling point above about 200° F. and polyhydric alcohols, and heating the mixture whereby a saponification reaction will be complete at temperatures below about 325° F.

7. A method of preparing essentially dry alkaline-earth metal soaps which comprises: heating a mixture of fatty glycerides and between about 159–2240% over stoichiometric of alkaline-earth metal hydroxide in the presence of an amount sufficient to catalytically influence a saponification reaction of a material selected from the group consisting of monohydric alcohols having a boiling point above about 200° F. and polyhydric alcohols whereby a saponification reaction will be complete in an hour or less at temperatures below about 375° F.

8. The method of claim 7 wherein the alkaline-earth metal hydroxide is present in amounts of from about 159% over stoichiometric to about 2240% over stoichiometric and the catalytic amount is between about 0.5 and about 10% by weight of the mixture.

9. A method of preparing an essentially dry calcium soap which comprises: heating a mixture of fatty glycerides and between about 159–2240% over stoichiometric of calcium hydroxide in the presence of a small amount sufficient to catalytically influence a saponification reaction of glycerine whereby a saponification reaction will be complete in an hour or less at temperatures below about 325° F.

10. In the preparation of a stable composition suitable for use as a wire-drawing compound, the steps comprising: mixing fatty glycerides and calcium hydroxide, said calcium hydroxide being present in amounts between about 159–2240% over stoichiometric, and heating said mixture in the presence of between about .5–10% of a material selected from the group consisting of monohydric alcohols having a boiling point above about 200° F. and polyhydric alcohols to initiate a saponification reaction, said reaction being completed in about an hour or less at temperatures below about 325° F., whereby an essentially dry solid compound of good mechanical strength and comprising a uniform dispersion of up to about 70% free calcium hydroxide in calcium soaps will be formed.

11. The method of claim 10 wherein the calcium hydroxide is present in an amount between about 1920–2240% over stoichiometric and the saponification reaction takes place in the presence of about 2% glycerine by weight of the mixture.

12. In a method for manufacturing essentially dry alkaline earth metal soaps the steps which comprise: heating a mixture of fatty glycerides and between about 0.5% and about 10% by weight of a material selected from the group consisting of monohydric alcohols having a boiling point above about 200° F. and polyhydric alcohols to a temperature of about 20°–50° F. above the melting point for solid fats and about the boiling point of water for normally liquid fats, adding between about 159–2240% over stoichiometric of an alkaline earth metal hydroxide to said mixture whereby a saponification reaction is initiated, and allowing the saponification reaction rapidly to go to completion.

13. In a method for manufacturing low moisture content alkaline earth metal soaps the steps which comprise: heating a mixture of fatty glycerides and between about 0.5 and 10% of glycerine to a temperature of about 20°–50° F. above the melting point for solid fats and about the boiling point of water for normally liquid fats, adding between about 159–2240% over stoichiometric of an alkaline-earth metal hydroxide to said mixture whereby a saponification reaction is initiated, and allowing the saponification reaction rapidly to go to completion.

References Cited in the file of this patent

UNITED STATES PATENTS

| | | |
|---|---|---|
| 2,251,092 | Williams | July 29, 1941 |
| 2,251,093 | Williams | July 29, 1941 |
| 2,294,535 | Burwell | Sept. 1, 1942 |
| 2,758,981 | Cooke et al. | Aug. 14, 1956 |
| 2,890,232 | Rogers et al. | June 9, 1959 |